Jan. 14, 1964  V. GESSEL  3,117,427
STORING OF PERISHABLE PRODUCTS
Filed Oct. 3, 1962  4 Sheets-Sheet 1
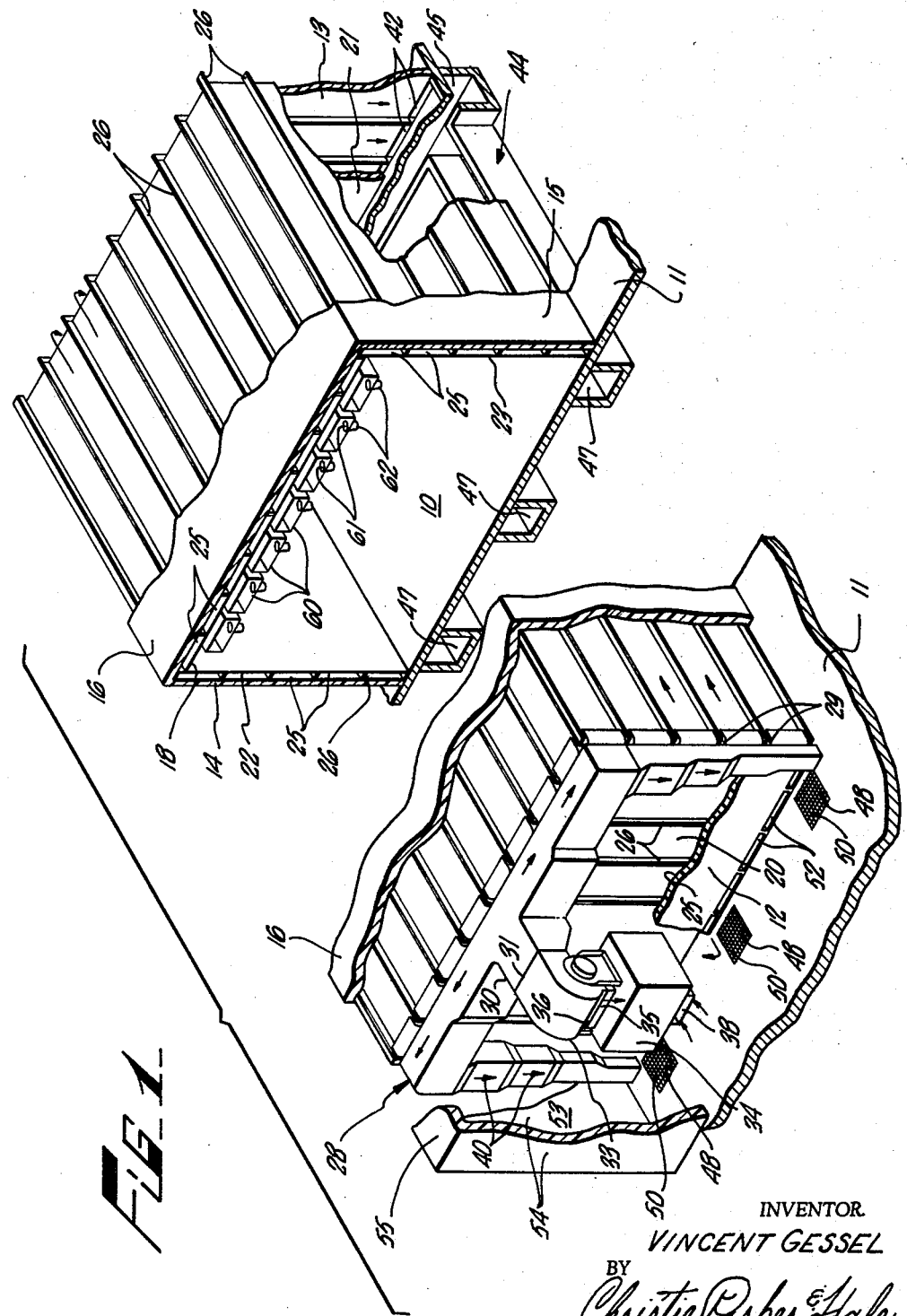
INVENTOR.
VINCENT GESSEL
BY
Christie Parker & Hale
ATTORNEYS.

Jan. 14, 1964  V. GESSEL  3,117,427
STORING OF PERISHABLE PRODUCTS
Filed Oct. 3, 1962  4 Sheets-Sheet 2
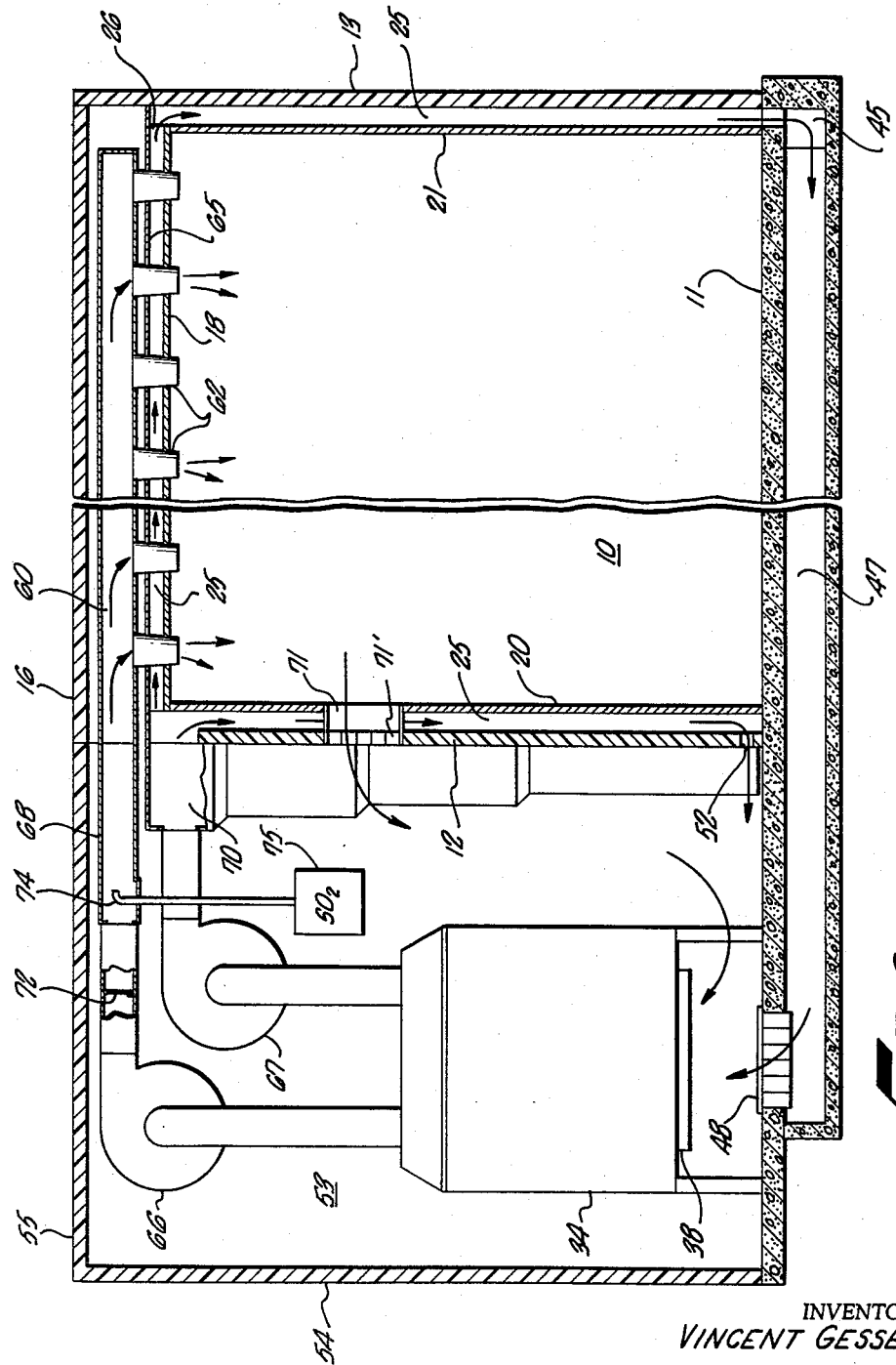
INVENTOR.
VINCENT GESSEL
BY
Christie Parker & Hale
ATTORNEYS.

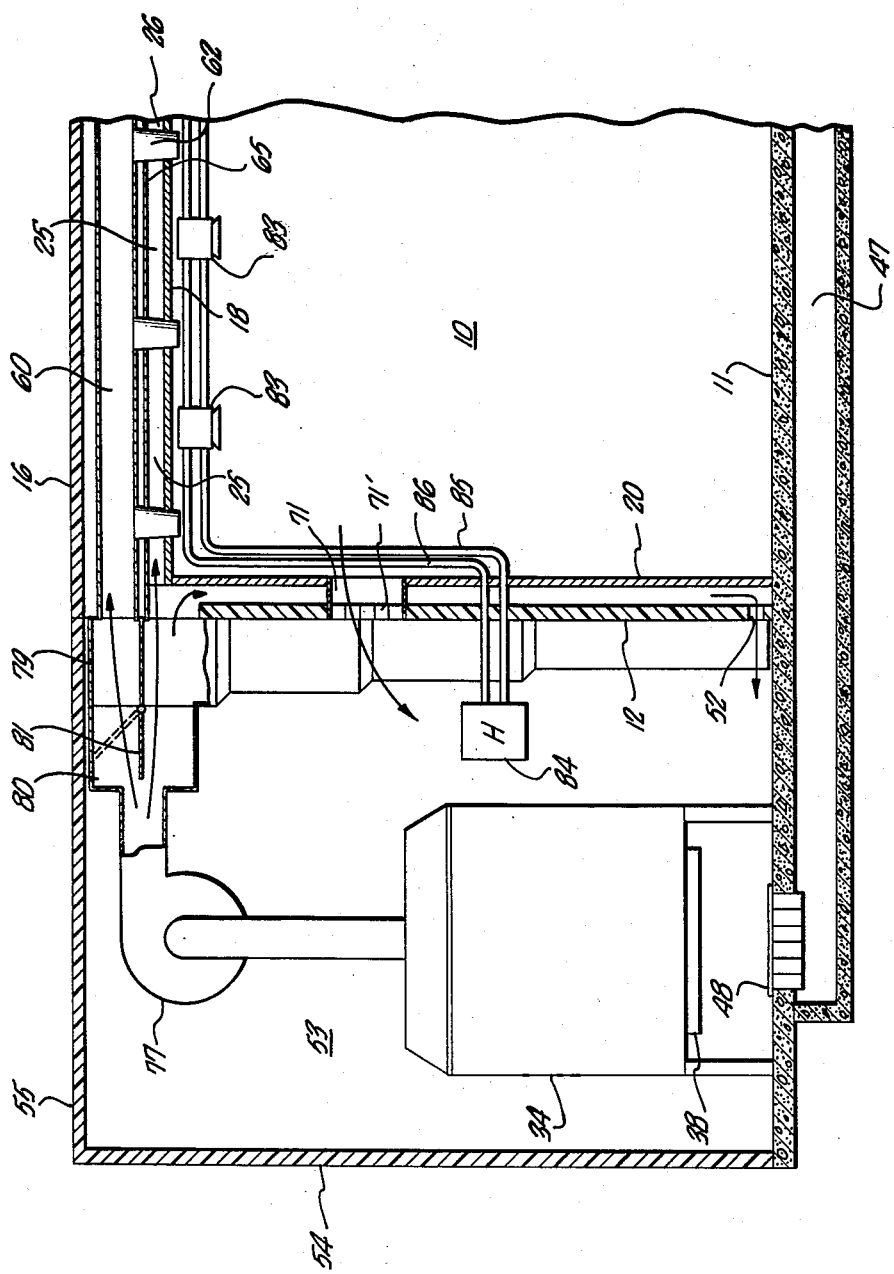

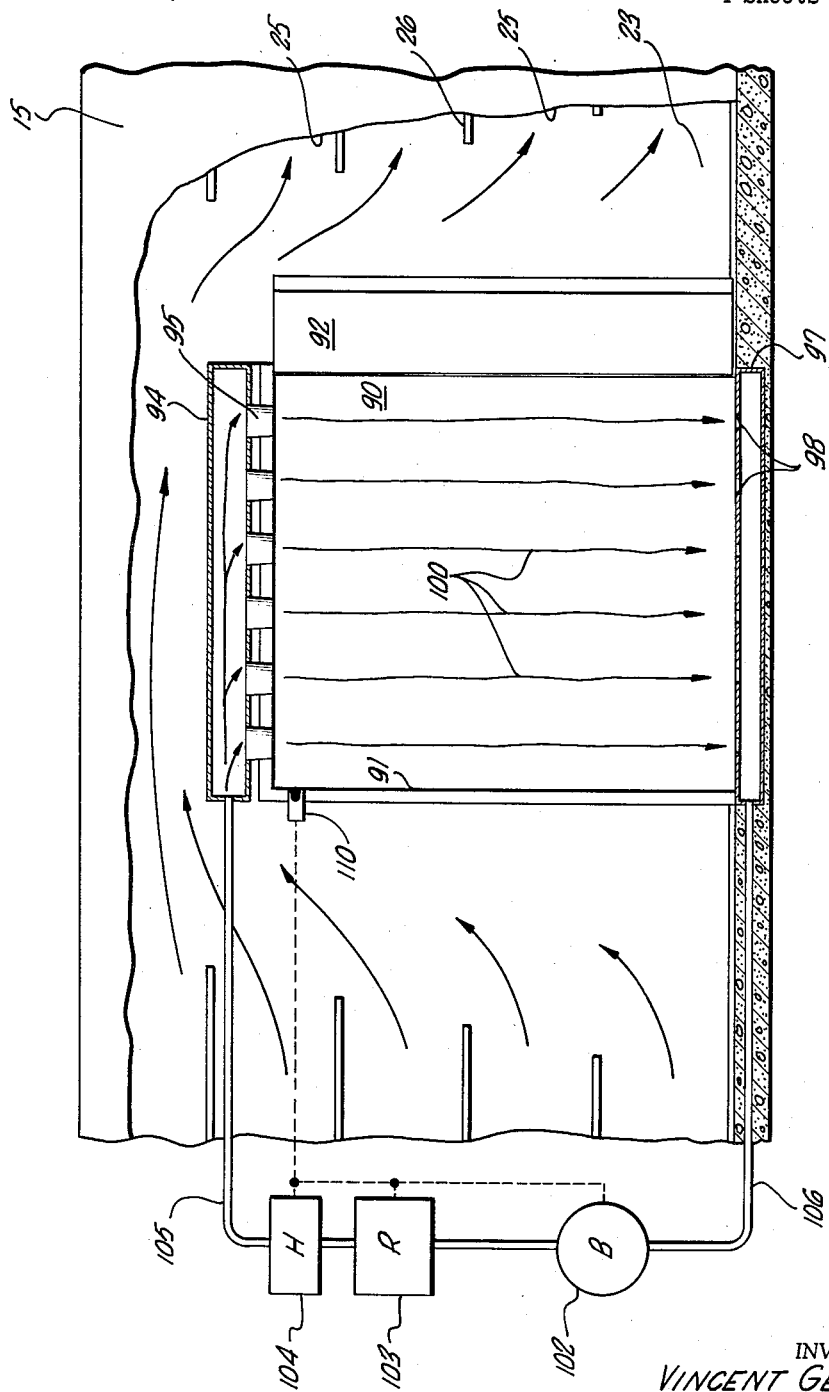

3,117,427
STORING OF PERISHABLE PRODUCTS
Vincent Gessel, 624 S. Palm Ave., Alhambra, Calif.
Filed Oct. 3, 1962, Ser. No. 228,193
10 Claims. (Cl. 62—271)

The present invention relates to the storing of perishable products and, more particularly, to methods and building structures for storing perishable products, such as produce.

It is well known that perishable products are often stored for a considerable time and are kept refrigerated or cooled during such storing period.

Thus, food produce, for instance, is usually cooled to a desired low temperature shortly after the harvesting thereof, and is thereafter kept at such low temperature for a longer period of time, which may be several weeks to several months. The cooling of the produce after harvesting from the field temperature to the desired storage temperature is usually referred to as "pre-cooling," while the cooling during the storage period is known as "holding."

It is also known that the produce stored will be subject to loss of weight and appearance and to deterioration, unless the relative humidity of the air in the storage space is at a high value so as to prevent dehydration of the produce.

This gives rise to several problems with which the existing systems are not able to cope.

First, the existing systems, in order to effectively cool the produce to the desired storage temperature, have to employ large quantities of refrigerated air of a temperature lower than the desired storage temperature of the produce. This refrigerated air is circulated through the storage room and, due to the above-mentioned high humidity of the air in the storage room, will bring about the condensation of moisture on the produce and especially on the inside walls of the storage room.

Secondly, the existing systems maintained the produce at the desired storage temperature by continuously circulating air through the storage room. The temperature of this air also had to be lower than the desired storage temperature of the produce, inasmuch as the heat brought about by losses through walls and ceiling of the storage space had to be effectively removed, in addition to the heat generated by evolution of the produce, and heat from persons entering the storage room and from equipment in and adjacent the storage area.

Thus, condensation of moisture also occurred during the relatively long storage period. This moisture condensation not only tended to lower the humidity of the room and to cause loss of weight and appearance of the produce, but also caused the formation of mold in the storage area, such as bortritus gray mold as in the case of grapes. At the same time it has been found that the continuous circulation of air past the produce during the long storage period also caused deterioration of the produce, which, at a given relative humidity, was substantially proportional to the velocity of the circulated air.

The present invention overcomes these disadvantages and, from one aspect thereof, resides in a method for storing perishable products, such as produce. According to this method, the products to be stored are pre-cooled to a predetermined temperature and are then maintained substantially at such predetermined temperature by continuously circulating a refrigerated medium confined along the walls and ceiling of the building structure in which the perishable products are stored.

From another aspect thereof, the invention resides in a building structure for carrying out the novel storage method. This building structure comprises walls and a ceiling for defining an enclosed storage space. An auxiliary wall structure is located adjacent each wall in close proximity thereto. An auxiliary or false ceiling is located adjacent the aforesaid ceiling. Means, such as a plurality of strips of material, are located between the ceiling and the false ceiling and each wall and corresponding auxiliary wall to provide a plurality of channels which are closed with respect to the storage space. A refrigerated medium, such as refrigerated air, is circulated through these channels during cooling of the produce.

Since these channels are maintained closed with respect to the storage space, no convection of air can emanate therefrom. In addition, the false ceiling and the auxiliary wall structures present a large heat dissipating surface to the storage space and the produce, so that the temperature of the refrigerated air circulated through the channels need not be much higher than the desired temperature in the storage space. In this manner, condensation of moisture and the occurrence of undesirable mold is avoided, and the produce is not subjected to air currents for long periods of time.

If desired, the building structure of the invention can be built to constitute a storage room for produce which has been pre-cooled in another room.

On the other hand, the building structure of the invention can also be provided with additional means for carrying out the pre-cooling step in addition to the above-mentioned holding process.

Thus, the structure of the invention with the enclosed channels mentioned above can be provided with a plurality of additional channels having members defining openings that issue into the storage space, and with means for circulating during the pre-cooling process a refrigerated medium, i.e., refrigerated air, through such additional channels, the opening thereof, and the storage space.

In an arrangement of the latter type, forced air flow past the produce will only occur during the relatively short pre-cooling process. At the same time, the refrigerated air circulating through the aforesaid enclosed channels will assist the cooling effect of the air circulated through the storage space, so that the establishment of undesirable temperature gradients and of moisture condensation in the storage area is largely avoided.

The invention will be more readily apparent from the following detailed description of preferred embodiments thereof, illustrated by way of example in the accompanying drawings, in which like parts are designated by like reference numerals, and in which:

FIG. 1 is a perspective, fore-shortened view of a storage structure embodying the invention, with parts broken away for the purpose of improved illustration;

FIG. 2 is a fore-shortened section through a modified storage structure embodying the invention;

FIG. 3 is a section through part of another modified storage structure embodying the invention; and FIG. 4 shows a detail of the storage structure shown in FIGS. 1, 2 or 3 and embodying a further modification.

In FIGS. 1, 2 and 3, a storage space 10 for perishable products or produce is delimited or defined by a floor 11, a front wall 12, a rear wall 13, two lateral walls 14 and 15 and a ceiling 16. It will be noted that parts of these walls, floor and ceiling are broken away in FIG. 1 to show the adjacent structure.

Walls 12 to 15 and ceiling 16 comprise an insulating material to avoid excessive heat transfer therethrough from the outside thereof. It is, of course, understood that walls 12 to 15 and ceiling 16 will also include other material, such as waterproof plywood or other construction materials, to increase the rigidity thereof. In addition, the walls 12 to 15 and ceiling 16 may be provided with a vapor seal, such as an external sealing coating, to avoid the dissipation of moisture therefrom in accordance with conventional practices.

In FIG. 1, ceiling 16 has an auxiliary or false ceiling 18 located adjacent thereto and spaced from the inside surface thereof. Each of the walls 12, 13, 14 and 15 has an auxiliary wall 20, 21, 22, and 23, respectively, located adjacent thereto and spaced from the inside surface thereof.

The spaces between ceiling 16 and false ceiling 18, wall 12 and auxiliary wall 20, wall 13 and auxiliary wall 21, wall 14 and auxiliary wall 22, and wall 15 and auxiliary wall 23 are divided into a plurality of channels 25 by means of strips 26 of a suitable material, such as metal or treated wood. Adjacent to the outside of front wall 12 there is located a manifold structure 28 which is preferably made of sheet metal and which has a plurality of outlets 29 that issue into the channels 25 adjacent front wall 12, ceiling 16 and lateral walls 14 and 15. In addition, manifold structure 28 has an inlet 30 to which there is attached the outlet 31 of a blower 33. A refrigeration unit 34, which may be of a conventional type, has an outlet 35 attached to inlet 36 of blower 33 and has an inlet 38 communicating with the space adjacent the outside of front wall 12. Blower 33 is effective to draw the air present in the space adjacent the outside of front wall 12 through the refrigeration unit 34 and to discharge such air into the channels adjacent front wall 12, ceiling 16 and lateral walls 14 and 15, by way of manifold structure 28, as indicated in FIG. 1 by a plurality of arrows 40. The refrigerated air forced through the channels 25 adjacent ceiling 16, wall 14 and wall 15 will flow past the false ceiling 18, the false wall structure 22 and the false wall structure 23, respectively, and to the rear wall 13. At rear wall 13, the air will flow toward floor 11, by way of the channels 25 adjacent rear wall 13. A plurality of openings 42 located in floor 11 to coincide with channels 25 adjacent rear wall 13 form part of a return path 44 for the air. This return path 44 further includes a first return channel 45 into which openings 42 issue, and a plurality of second return channels 47 which extend from return channel 45, along the underside of floor 11 to corresponding openings 48 in the portion of floor 11 adjacent the outside of front wall 12. These openings 48 are provided with grilles 50.

The air flowing from manifold structure 28 through channels 25 adjacent front wall 12 returns through a plurality of openings 52 to the space adjacent the outside of front wall 12.

In this manner, the refrigerated air which flows through channels 25 is returned to the inlet 38 of the refrigeration unit 34 and blower 33 combination, and will be recirculated through the channels 25. In the embodiments shown, the refrigeration unit 34 and blower 33 are located in a plenum chamber 53 which is defined by heat-insulated walls 54 and a heat-insulated ceiling 55, and which has the return openings 48 and 52 issuing thereinto.

The refrigeration unit 34 and the blower 33 are dimensioned and adjusted so that the air blowing through channels 25 will maintain the auxiliary or false ceiling 18 and walls 20 to 23 at a predetermined temperature. These false ceiling 18 and false walls 20 to 23 are preferably made of sheet metal to prevent the occurrence of a large temperature differential thereacross.

Considering the fact that the channels 25 are maintained closed with respect to the storage space 10, it will be appreciated that the heat transfer from the inside of storage space 10 to the air circulating in channels 25 will be primarily by way of radiation and, to a minor extent, by way of conduction. However, undesirable large convection currents will not occur in the storage space 10 during the relatively long storage period.

The invention is, therefore, ideally suited to provide a holding room in which pre-cooled perishable products, such as food produce, may be stored at a desired temperature, without being subjected to the initially-mentioned adverse effects.

If desired, the structure of the invention may also be provided with a pre-cooling system, so that the produce can be pre-cooled to a desired low temperature in the same room in which it is stored for the subsequent storage period.

Since the pre-cooling period should be and is relatively short as compared to the long subsequent storage period, the occurrence of air convection in the cooling room during the pre-cooling step can be tolerated in the interest of a speedy and effective pre-cooling.

Thus, a precooling system circulating refrigerated air through the cooling area may be employed in combination with the structure of the invention so far described.

In this case, the refrigerated air flowing through the channels or ducts adjacent walls 20 to 23 and ceiling 16 will assist the pre-cooling system in bringing about the desired storage temperature and will, at the same time, avoid the condensation of moisture on the large wall and ceiling areas and on other parts of the storage space.

An ideally suited pre-cooling system for use in combination with the basic structure of the subject invention is, for instance, the system described in my U.S. Patent No. 2,825,211, issued March 4, 1958.

This latter pre-cooling system uses a plurality of refrigerated air dispensing ducts extending along the ceiling of the cooling space and having openings provided with hood or jet elements issuing into the cooling space.

A plurality of such pre-cooling ducts or channels 60 are indicated in FIG. 1 as being arranged in the storage space 10 below false ceiling structure 18. These ducts 60 may preferably be tapered in the manner indicated in my aforesaid patent and are also provided with openings 61 and associated hood or jet elements 62. During operation the ducts 60 are, of course, supplied with refrigerated air by a suitable refrigeration unit, such as the one shown in the above-mentioned patent.

This latter refrigeration unit has not been shown in FIG. 1 to avoid crowding thereof. As a matter of fact, the shown refrigeration unit 34, which usually provides refrigerated air for channels 25 may, during the short pre-cooling period, also be employed to provide the refrigerated air for both channels 25 and channels or ducts 60.

In this case, the refrigeration unit 34 will have a capacity rating sufficient to supply the refrigerated air required for effecting the pre-cooling step. During holding of the produce, when the pre-cooling system is switched off, the refrigeration unit 34 will be adjusted so that it only operates at a cooling capacity which is significantly lower than its aforesaid full capacity rating.

As a practical example, I have found that a cooling capacity amounting to about 20% of the full pre-cooling capacity of the refrigeration unit will be adequate to perform the required holding process during the storage period.

During pre-cooling, about 80% of the capacity rating of the refrigeration unit will be consumed to effect the pre-cooling effect brought about by the system comprising ducts 60, while about 20% of such capacity rating will be consumed by the simultaneously operating system comprising channels 25.

It will, therefore, be appreciated that the convection currents emanating from ducts 60 can be reduced over those existing in conventional systems, inasmuch as about 20% of the pre-cooling effect will be taken care of by the operation of channels 25.

To take full advantage of the pre-cooling system, the produce may be distributed and arranged in space 10 in the manner described in my above-mentioned patent.

FIGS. 2 and 3 illustrate two ways in which the ducts 60 and the channels 25 may be supplied from the same refrigeration unit, and also show a modified arrangement of ducts 60 and the channels or ducts 25 adjacent ceiling 16.

Considering first the latter modified channel arrangement, it will be seen that the ducts 60 in FIGS. 2 and 3 are arranged above the ceiling channels 25. In this case the channels 25 at ceiling 16 are defined by false ceiling 18 and by an additional false ceiling structure 65 located between false ceiling 18 and ducts 60, and by the above-mentioned channel divider strips 26 which are now located between false ceiling 18 and additional false ceiling structure 65. The hood or jet elements 62 extend now through false ceiling 18 and additional false ceiling 65. This arrangement has the advantage of avoiding obstruction of false ceiling 18 by the ducts 60. To avoid unnecessary heat dissipation, the ducts 60 and, if desired, also the additional false ceiling 65 may be made of a low heat-conducting material, such as plywood, which should be of a moisture-resistant grade.

In FIG. 2, two blowers 66 and 67 are connected to refrigeration unit 34 and, respectively, to a manifold structure 68 issuing into ducts 60 and a manifold structure 70 issuing into channels 25. During the pre-cooling step, both blower 66 and 67 are energized to supply refrigerated air to channels 25 and ducts 60.

An opening 71 with a grille 71′ is provided in wall 12 to afford a return path of the air issuing from jet elements 62 into room 10. After the pre-cooling step, blower 66 is turned off, and the capacity of refrigeration unit 34 is reduced as indicated above.

Suitable means, such as a gravity-type baffle 72, prevent the circulation of air through blower 66 when such blower 66 is turned off.

If desired, the blower 66 may be turned on from time to time and a suitable fumigant, such as sulfur dioxide in 0.025% concentration, may be introduced into room 10 by means of a nozzle 74 which is connected to a conventional fumigant supply unit 75 and which issues into manifold structure 68 of ducts 60.

This fumigation system may, of course, also be employed in the embodiments of FIGS. 1 and 3, and will smother any molding germs which may be present on the produce.

In FIG. 3, a common blower 77 is used to supply air to channels 25 and ducts 70 or to channels 25 alone. In this case, a manifold 79 serving channels 25 and ducts 60 is provided. Manifold structure 79 comprises an air distribution chamber 80 in which there is located an air distribution baffle structure 81 having a first position indicated in solid lines and a second position indicated in dotted lines.

During pre-cooling, the baffle is maintained in the aforesaid first position, so that ducts 60 as well as channels 25 will be supplied with refrigerated air.

After pre-cooling and during holding of the produce, baffle structure 81 is moved to its second position by suitable means, such as manually operable or motor-driven devices (not shown). In this case, the refrigerated air will be prevented from entering ducts 60 and will only circulate through channels 25 in the manner mentioned above.

It will, of course, be understood that the manifold structure 79 should be dimensioned such that the refrigerated air is properly divided among ducts 60 and channels 25 during the pre-cooling step. In addition, the refrigeration unit 34 will be adjusted to operate at a lower refrigeration rate when baffle structure 81 is in its second position, and the rate of rotation of blower 77 may at the same time be reduced.

The structure according to the invention and its above-mentioned modifications may also include a humidifying system for establishing a predetermined relative humidity in room 10 and for maintaining such relative humidity within a predetermined range, which may range from 80% to as high as close to 100%.

This humidification system may comprise moisture dispensing means effective inside storage space 10, such as a plurality of water spray or mist dispensing units located inside storage space 10 and connected to a water spray supply unit.

A suitable humidifier system which may be employed in the subject structure is disclosed in my copending U.S. Patent application Serial No. 166,270, filed January 15, 1962.

Thus, a plurality of water atomizers 83 of the type shown in such copending application may be located adjacent to false ceiling 18, as illustrated in FIG. 3. A water tank and air compression unit 84, generally of the type shown in the above-mentioned copending application, is located in the plenum chamber 53, and a water conduit 85 and a pressurized air conduit 86 extend from unit 84 to atomizers 83.

The atomizers 83 are actuated to establish a desired relative humidity in space 10, and are operated intermittently to maintain such relative humidity during the storage period.

Since the air circulation during the storage period extends through channels 25 and not through space 10, and since the subject invention avoids undue condensation within space 10, the desired relative humidity in the storage area will subsist for considerably longer periods than with conventional systems, so that the capacity and time of operation of the humidifier system can be reduced accordingly.

It will, of course, be understood that the embodiments of FIGS. 1 and 2 may be and preferably are also provided with such a humidifying system.

In addition, it will be understood that the pre-cooling system comprising ducts 70 may also be actuated from time to time to quickly reduce the temperature within storage space 10, should such temperature tend to exceed its predetermined level during the storage period. This may occur if the storage space 10 is frequently entered by persons and equipment, such as for the purpose of removing stored goods or for placing pre-cooled goods into the storage room. It will, of course, be understood that the structures of FIGS. 1 to 3 will have a suitable heat-insulated door (not shown) to permit such entry into the storage space.

FIG. 4 schematically illustrates a modified doorway 90 which is effective to reduce the increase in temperature and the loss of moisture while persons enter or leave storage room 10. This doorway 90 is located in one of the walls of the storage space 10, such as in wall 15, and comprises a door frame 91 which extends through auxiliary wall structure 23 and which has a door 92 hinged thereon. The strips 26 are recessed from door frame 91 so that the flow of air through channels 25 is not interrupted.

An air distribution structure 94 having jets 95 and being mounted at the top of door frame 91 and an air return structure 97 having openings 98 and being mounted at the bottom of door frame 91 are employed to establish a "curtain" of air 100 across doorway 90. The air for this "curtain" 100 is supplied to distribution structure 94 by means of a blower 102 which forces such air through a refrigeration unit 103, a humidifier apparatus 104, and a conduit 105, and which withdraws such air through a return conduit 106. The air flowing across doorway 90 is, therefore, refrigerated and humidified so that the temperature and relative humidity in storage space 10 will be kept at their desired values while door 92 is temporarily open. Blower 102 and units 103 and 104 may be of conventional construction and preferably are adapted to be controlled by a door contact 110 which causes energization of blower 102 and units 103 and 104 only when door 92 is open. It would also be possible to derive refrigerated air for doorway 90 from the refrigeration unit 34, if desired.

While certain preferred embodiments of the invention have been described and illustrated, it will be appreciated that various modifications within the scope of the invention are possible. It will also be understood that the refrigerated medium circulated through channels 25 could, in principle, be a medium other than air. It is, however, believed that the use of air for this purpose will be found most practicable.

In addition, various manually operated or automatic control devices may and normally will be employed in connection with the structures of the invention to determine and control the temperature and humidity in the storage area. These control devices have not been illustrated, since they do not form part of the subject invention and may be of conventional construction.

I claim:

1. A building structure for storing perishable products, comprising walls and a ceiling for delimiting an enclosed storage space, means for defining a plurality of channels inside said walls and ceiling and for maintaining said channels closed with respect to said storage space, means for circulating a refrigerated medium through said channels, a plurality of additional channels having members defining openings issuing into said storage space, and means for selectively circulating a refrigerated medium through said additional channels, said openings and said storage space.

2. A building structure for storing perishable products, comprising walls and a ceiling for delimiting an enclosed storage space, means for defining a plurality of first channels inside said walls and ceiling and for maintaining said channels closed with respect to said storage space, a plurality of second channels having openings issuing into said storage space, refrigeration means, a first blower for circulating air through said refrigeration means and said plurality of first channels, and a second blower for selectively circulating air through said refrigeration means, said plurality of second channels, said openings, and said storage space.

3. A building structure for storing perishable products, comprising walls and a ceiling for delimiting an enclosed storage space, means for defining a plurality of first channels inside said walls and ceiling and for maintaining said channels closed with respect to said storage space, a plurality of second channels having openings issuing into said storage space, a refrigeration unit, blower means for drawing air through said refrigeration unit, and a selectively operable damper structure for simultaneously supplying said air drawn through the refrigeration unit to said first channels and said second channels, and selectively only to said first channels.

4. A building structure for storing perishable products, comprising walls and a ceiling for delimiting an enclosed storage space, means for defining a plurality of first channels inside said storage space and adjacent said ceiling and for maintaining said first channels closed with respect to said storage space, means for defining a plurality of second channels inside said storage space and adjacent said walls and for maintaining said second channels closed with respect to said storage space, means for circulating a refrigerated medium through said first and said second channels, means defining a plurality of third channels inside said storage space and adjacent said first channels, said third channels having openings issuing into said storage space, and means for selectively circulating a refrigerated medium through said third channels, said openings thereof and said storage space.

5. A building structure for storing perishable products, comprising walls and a ceiling for delimiting an enclosed storage space, means for defining a plurality of first channels inside said storage space and adjacent said walls and for maintaining said first channels closed with respect to said storage space, means for defining a plurality of second channels inside said storage space and in proximity to and spaced from said ceiling and for maintaining said second channels closed with respect to said storage space, means for circulating a refrigerated medium through said first and said second channels, means for defining a plurality of third channels extending in the space between said ceiling and said second channels and having discharge elements extending from said third channels through said second channels and issuing into said storage space, and means for selectively circulating a refrigerated medium through said third channels, said discharge elements thereof and said storage space.

6. A building structure for storing perishable products, comprising a floor, walls and a ceiling for delimiting an enclosed storage space, means for defining a plurality of channels inside said floor, walls and ceiling and for maintaining said channels closed with respect to said storage space, means for circulating a refrigerated medium through said channels, a plurality of additional channels located at said ceiling and having members defining openings issuing into said storage space, means for selectively circulating a refrigerated medium through said additional channels, said openings and said storage space, and moisture dispensing means effective inside said storage space for establishing and maintaining a predetermined range of relative humidity in said storage space.

7. A building structure for storing perishable products, comprising walls and a ceiling for delimiting an enclosed storage space, means for defining a plurality of first channels inside said storage space and adjacent said ceiling and for maintaining said first channels closed with respect to said storage space, means for defining a plurality of second channels inside said storage space and adjacent said walls and for maintaining said second channels closed with respect to said storage space, means for circulating a refrigerated medium through said first and said second channels, means defining a plurality of third channels inside said storage space and adjacent said first channels, said third channels having openings issuing into said storage space, means for selectively circulating a refrigerated medium through said third channels, said openings thereof and said storage space, and moisture dispensing means effective inside said storage space for establishing and maintaining a predetermined range of relative humidity in said storage space.

8. A building structure for storing perishable products, comprising walls and a ceiling for delimiting an enclosed storage space, means for defining a plurality of first channels inside said storage space and adjacent said walls and for maintaining said first channels closed with respect to said storage space, means for defining a plurality of second channels inside said storage space and in proximity to and spaced from said ceiling and for maintaining said second channels closed with respect to said storage space, means for circulating a refrigerated medium through said first and said second channels, means for defining a plurality of third channels extending in the space between said ceiling and said second channels and having discharge elements extending from said third channels through said second channels and issuing into said storage space, means for selectively circulating a refrigerated medium through said third channels, said discharge elements thereof and said storage space, and moisture dispensing means effective inside said storage space for establishing and maintaining a predetermined range of relative humidity in said storage space.

9. A building structure for storing perishable products, comprising a floor, walls and a ceiling for delimiting an enclosed storage space, means for defining a plurality of channels inside said floor, walls and ceiling and for maintaining said channels closed with respect to said storage space, means for circulating a refrigerated medium through said channels, a plurality of additional channels located at said ceiling and having members defining openings issuing into said storage space, means for selectively circulating a refrigerated medium through said additional channels, said openings and said storage space, moisture dispensing means effective inside said storage space for establishing and maintaining a predetermined range of relative humidity in said storage space, and means associated with said additional channels for selectively dispensing a fumigant through said openings in said third channels into said storage space.

10. A building structure for storing perishable products, comprising walls and a ceiling for delimiting an enclosed storage space, means for defining a plurality of first channels inside said storage space and adjacent said walls and for maintaining said first channels closed with respect to said storage space, means for defining a plurality of second channels inside said storage space and in proximity to and spaced from said ceiling and for maintaining said second channels closed with respect to said storage space, means for circulating a refrigerated medium through said first and said second channels, means for defining a plurality of third channels extending in the space between said ceiling and said second channels and having discharge elements extending from said third channels through said second channels and issuing into said storage space, means for selectively circulating a refrigerated medium through said third channels, said discharge elements thereof and said storage space, and moisture dispensing means effective inside said storage space for establishing and maintaining a predetermined range of relative humidity in said storage space, and means associated with said third channels for selectively dispensing a fumigant through said discharge elements of said third channels into said storage space.

References Cited in the file of this patent

UNITED STATES PATENTS

| | | |
|---|---|---|
| 2,071,175 | Philipp | Feb. 16, 1937 |
| 2,439,487 | Reilly | Apr. 13, 1948 |
| 2,664,317 | Haywood | July 17, 1953 |
| 2,825,211 | Gessel | Mar. 4, 1958 |
| 2,869,336 | Smidl | Jan. 20, 1959 |
| 2,881,600 | Elfving | Apr. 14, 1959 |
| 2,882,701 | Nelson | Apr. 21, 1959 |
| 3,068,775 | Zehnder | Dec. 18, 1962 |

FOREIGN PATENTS

| | | |
|---|---|---|
| 490,835 | Italy | Feb. 20, 1954 |